April 21, 1953 K. SZILLAGE 2,635,911
NONCLOG RAKE
Filed Oct. 23, 1947 2 SHEETS—SHEET 2
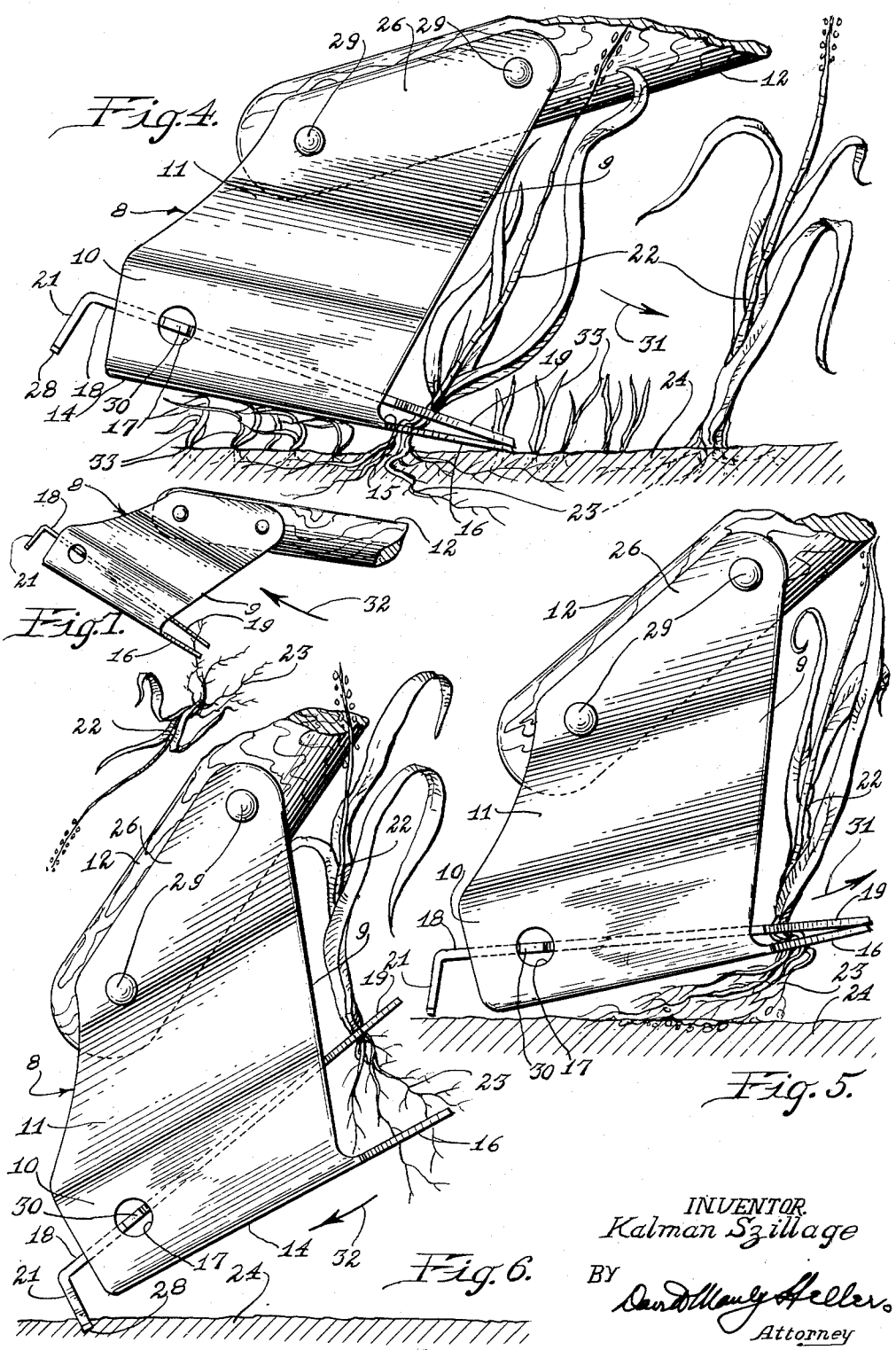
INVENTOR
Kalman Szillage
BY
David Manly Heller
Attorney Patented Apr. 21, 1953

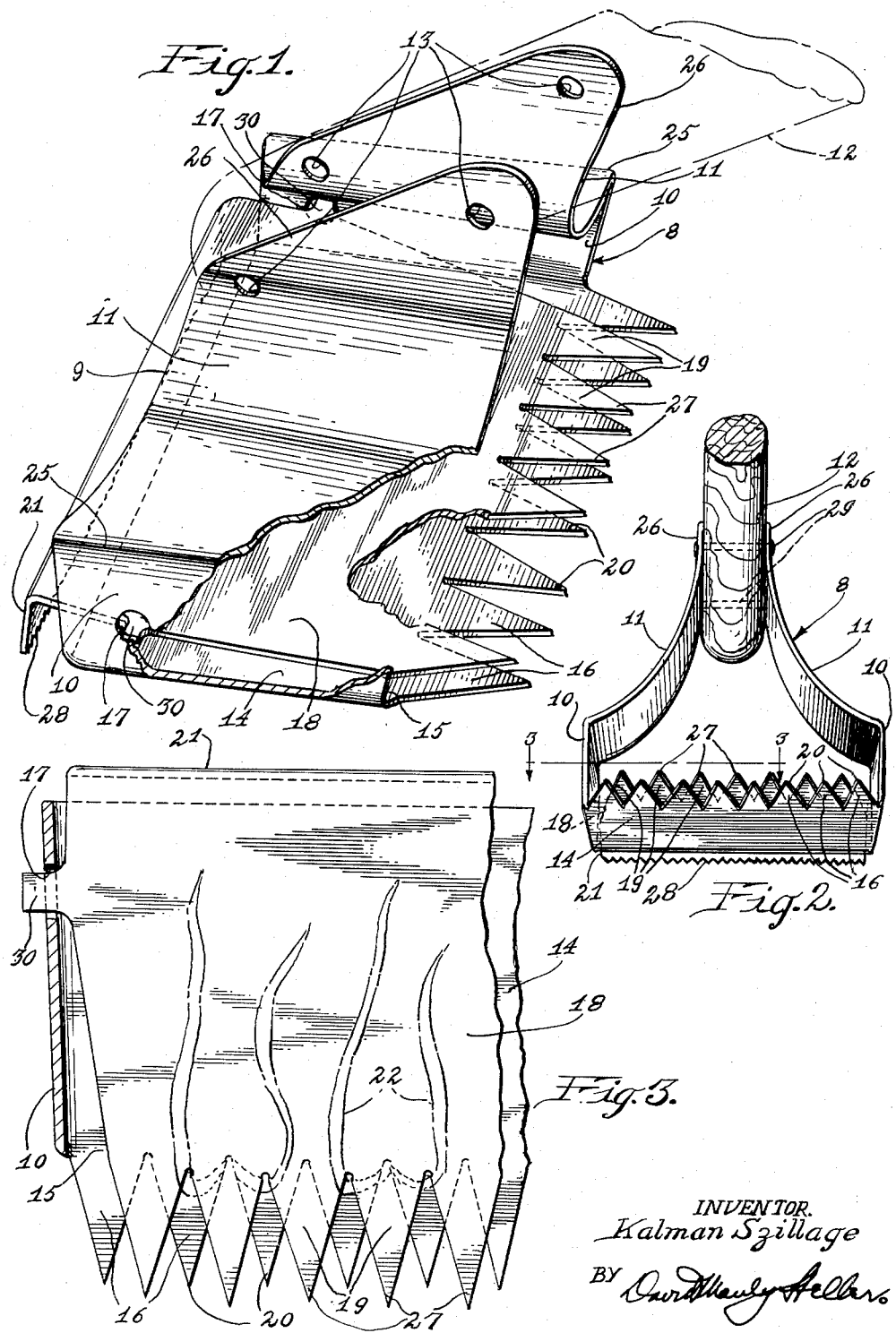

2,635,911

UNITED STATES PATENT OFFICE 2,635,911

NONCLOG RAKE

Kalman Szillage, Gary, Ind., assignor to Kelly Products Co., Inc., a corporation of Illinois Application October 23, 1947, Serial No. 781,733

11 Claims. (Cl. 294—50)

My invention relates to non-clog rakes.

An important object of my invention is to provide a non-clog rake, which is manipulated by an attached handle and which has, in the bottom portion of its boot, a set of fixed teeth. A second set of equal-sized teeth are formed in a tongue which is hingeably mounted within the said boot. The two sets of teeth are disposed in staggered relationship and provide a gripping and self-locking hold upon the stalks of obnoxious weeds, such as crab grass, which grow in gardens and lawns, for the purpose of uprooting the said weeds or crab grass.

A further object of my invention is to provide a non-clog rake having a serrated heel portion formed on the rear of the hinged tongue, which being engaged by, or dug into, the surface of the earth on the back stroke of the rake will cause an angular separation between the teeth of the said tongue and boot portions, freeing therefrom the uprooted crab grass or weed and allowing it to be tossed aside.

A further object of my invention is to provide a non-clog rake which, while engaging and uprooting such obnoxious weeds, such as crab grass, will not harm the shorter and finer-leaved lawn grasses.

A still further object of my invention is to provide a non-clog rake of such simple design and construction so as to be economically manufactured in large quantities.

Other objects and advantages embraced in my invention will be disclosed in the following description and the accompanying illustrations, in which like parts are designated by like numerals, and in which Fig. 1 is a perspective view of my invention, with parts cut away, to show its operation.

Fig. 2 is a front view of my invention with a handle attached.

Fig. 3 is a cross-sectional view taken substantially on lines 3—3 on Fig. 2.

Fig. 4 is a side view of my invention shown with the teeth engaging a stalk of crab grass at the beginning of the stroke.

Fig. 5 is a side view of my invention shown uprooting a stalk of crab grass from the earth.

Fig. 6 is a side view of my invention showing a stalk of crab grass being disengaged from the rake in the return stroke.

Fig. 7 is a side view of my invention showing a stalk of crab grass being released or dropped from the said rake.

My invention is generally designated 8 and consists of a boot 9, the sides 10 of which are inwardly bent at 25 and formed into a tapered and arcuate portion 11 ending in a clamping portion 26, which is provided with holes 13 through which pins 29 attach the rake handle 12 to the said rake 8. The bottom 14 of boot 9 is provided with a toe portion 15 which is formed into a number of teeth 16. A tongue 18 is hingeably mounted by means of ears 30 formed on the side edges thereof and extending into holes 17 in the sides 10 of the said boot 9.

The front edge of tongue 18 is formed into a number of teeth 19 of approximately the same size as the teeth 16, but alternately placed so that the tips 27 of the teeth 19 may fall halfway between the tips 20 of the teeth 16. An angularly-shaped heel 21 is formed on the rear of tongue 18 and its edge is serrated at 28. The tips 27 of the teeth 19, the tips 20 of the teeth 16 and the serrated edge 28 are normally on the same plane.

The use of my non-clog rake is best illustrated in Figs. 4, 5, 6, and 7. In Fig. 4, my non-clog rake is shown being swung in the direction of the arrow 31, and its two sets of teeth 16 and 19 are shown engaging the lowermost portion of a stalk of crab grass 22, the roots 23 of said crab grass 22 being shown in the earth 24. Fig. 5 illustrates the continuation of the stroke of the rake in the direction of arrow 31, with the crab grass 22 shown uprooted from the earth 24. Fig. 6 illustrates the return stroke in the direction of arrow 32, and showing the serrated edge 28 of heel 21 engaging the earth 24, and causing an angular separation between the points of the teeth 19 of the tongue 18 and the teeth 16 of the boot 9. This action frees the stalk of crab grass 22 from its locking engagement with the said two sets of teeth 16 and 19, allowing it to be dropped or tossed aside, as shown in Fig. 7.

One of the structural advantages of my non-clog rake is that, while it is wide enough to attack and uproot any obnoxious weed or crab grass, it does not harm or uproot lawn grass, as shown in Fig. 4; the lawn grass being designated 33 and shown being flattened and passing under the bottom 14 of the boot 9 as it uproots the crab grass 22.

The rake is particularly adapted for the uprooting of clumps of crab grass, such as grow in areas having sandy soil. With a little practice, the user can, without breaking the rhythm of the stroke, uproot a clump of crab grass, or obnoxious weed and, in the return stroke, cause the said crab grass or weed to be disengaged from the non-clog rake, and to drop therefrom.

It will be noticed, as illustrated in Fig. 4, that on the downstroke, gravity, together with the centrifugal force of the stroke, will cause the forward portion of the tongue 18 to drop into a locking position with the teeth 16 of the boot, in which position the stalk of the crab grass 22 will be firmly engaged and twisted between the two sets of teeth 16 and 19 to allow the said stalk or clump of crab grass to be uprooted, as shown in the illustrations 4, 5, and 6.

Inasmuch as my invention is susceptible of modification and alteration, it is understood that my invention is not to be restricted to the specific form shown; my invention to be limited only to the scope and spirit defined in the appended claims.

Having thus described and disclosed my invention, what I claim as new, and desire to secure by Letters Patent, is:

1. A gravity-actuated non-clog weeding rake comprising, a boot element having a horizontal bottom, two sides and terminating in a clamping portion, a handle element secured to the said clamping portion in angular relationship to the horizontal bottom of the said boot element, the said boot element being further provided with a toothed toe portion at its leading edge, and a gravity actuated toothed tongue element capable of actuation by gravity to a closed weed-engaging position and articulately secured at the said sides and within the confines of the said boot element to operate in substantially parallel relationship therewith.

2. The gravity-actuated non-clog weeding rake of claim 1 in which the tips of the teeth of both said toe portion and the said tongue element lie in the same vertical plane and are in staggered relationship in a horizontal plane.

3. The gravity-actuated non-clog weeding rake of claim 1 in which the point of articulation of the said tongue element is in a plane above the plane of the said toothed toe portion.

4. The gravity-actuated non-clog weeding rake of claim 1 in which the tips of the teeth of both said toe portion and the said tongue element lie in the same vertical plane and are in staggered relationship in a horizontal plane, the point of articulation of the said tongue element being in a plane above the plane of the said toothed toe portion.

5. The gravity-actuated non-clog weeding rake of claim 1 in which the said tongue element is provided with a heel portion adapted to be tripped separating the teeth of said boot and tongue elements to free the same of uprooted weeds retained therebetween.

6. The gravity-actuated non-clog weeding rake of claim 1 in which the tips of the teeth of both said toe portion and the said tongue element lie in the same vertical plane and are in staggered relationship in a horizontal plane, the said tongue element being provided with a heel portion adapted to be tripped separating the teeth of said boot and tongue elements to free the same of uprooted weeds retained therebetween.

7. The gravity-actuated non-clog weeding rake of claim 1 in which the point of articulation of the said tongue element is in a plane above the plane of the said toothed toe portion, the said tongue element being provided with a heel portion adapted to be tripped separating the teeth of said boot and tongue elements to free the same of uprooted weeds retained therebetween.

8. The gravity-actuated non-clog weeding rake of claim 1 in which the tips of the teeth of both said toe portion and the said tongue element lie in the same vertical plane and are in staggered relationship in a horizontal plane, the point of articulation of the said tongue element being in a plane above the plane of the said toothed toe portion, the said tongue element being provided with a heel portion adapted to be tripped separating the teeth of said boot and tongue elements to free the same of uprooted weeds retained therebetween.

9. In a rake of the character described having a handle element; a substantially flat-bottomed boot element affixed to said handle, said boot element provided with a toothed toe portion at its leading edge, and a toothed tongue element articulately secured within said boot, said toothed tongue element movable by gravity to a closed weed-engaging position.

10. The rake of claim 9 in which said toothed tongue element is further capable of angular movement with respect to said toothed toe portion to an open weed-disengaging position.

11. The rake of claim 9 in which toothed tongue element is provided with a serrated heel capable of engagement to assist in moving said toothed tongue element to an open position with respect to said toothed toe portion.

KALMAN SZILLAGE.

References Cited in the file of this patent

UNITED STATES PATENTS

| Number | Name | Date |
|---|---|---|
| 39,464 | Burson et al. | Aug. 11, 1863 |
| 53,127 | Duvall | Mar. 13, 1866 |
| 962,576 | Menzl | June 28, 1910 |